(12) United States Patent  
Skofljanec

(10) Patent No.: US 6,722,925 B2  
(45) Date of Patent: Apr. 20, 2004

(54) HOUSING FOR SAFETY-RELEVANT CONTROL DEVICES IN VEHICLES

(75) Inventor: Robert Skofljanec, Moos-Bankholzen (DE)

(73) Assignee: TRW Automotive Electronics & Components GmbH & Co. KG, Radolfzell (DE)

(*) Notice: Subject to any disclaimer, the term of this patent is extended or adjusted under 35 U.S.C. 154(b) by 0 days.

(21) Appl. No.: 09/998,981

(22) Filed: Nov. 15, 2001

(65) Prior Publication Data

US 2002/0060448 A1 May 23, 2002

(30) Foreign Application Priority Data

Nov. 17, 2000 (DE) ..................... 200 19 524 U

(51) Int. Cl.⁷ ............................................... H01R 13/64
(52) U.S. Cl. ........................................ 439/680; 439/188
(58) Field of Search ............................. 439/680, 609, 439/489, 352, 188

(56) References Cited

U.S. PATENT DOCUMENTS

| 4,451,107 A | * | 5/1984 | Dola et al. ................... 439/609 |
| 4,900,261 A | * | 2/1990 | Gentry et al. ................ 439/680 |
| 5,055,058 A | * | 10/1991 | Nagasaka et al. ............ 439/188 |
| 5,175,928 A | * | 1/1993 | Grabbe ........................ 439/885 |
| 5,275,575 A | * | 1/1994 | Calhaly et al. .............. 439/680 |
| 5,417,590 A | * | 5/1995 | Dechelette et al. ......... 439/680 |
| 5,456,616 A | * | 10/1995 | Fuerst et al. ................ 439/608 |
| 5,885,088 A | * | 3/1999 | Brennan et al. ............ 439/680 |
| 6,000,954 A | * | 12/1999 | Medina et al. .............. 439/607 |

FOREIGN PATENT DOCUMENTS

| DE | 19704991 A1 | 8/1997 |
| DE | 19813458 A1 | 10/1998 |
| DE | 19837833 A1 | 2/2000 |
| DE | 19833720 C1 | 5/2000 |

* cited by examiner

Primary Examiner—Gary Paumen  
Assistant Examiner—Briggitte R. Hammond  
(74) Attorney, Agent, or Firm—Tarolli, Sundheim, Covell & Tummino L.L.P.

(57) ABSTRACT

A housing system for safety-relevant control devices in vehicles comprises a receptacle (14) for attachment to a car body and a housing part (12) that can be inserted into the receptacle (14). The receptacle (14) and the housing part (12) have complementary form-fitting elements (28, 30) that represent a coding and that engage each other when the housing part (12) is mounted in the receptacle (14), permitting complete assembly of the housing part (12) into the receptacle (14) only when the form-fitting elements (28, 30), of the receptacle (14) and the housing part (12) satisfy a predefined complementarily condition.

10 Claims, 2 Drawing Sheets

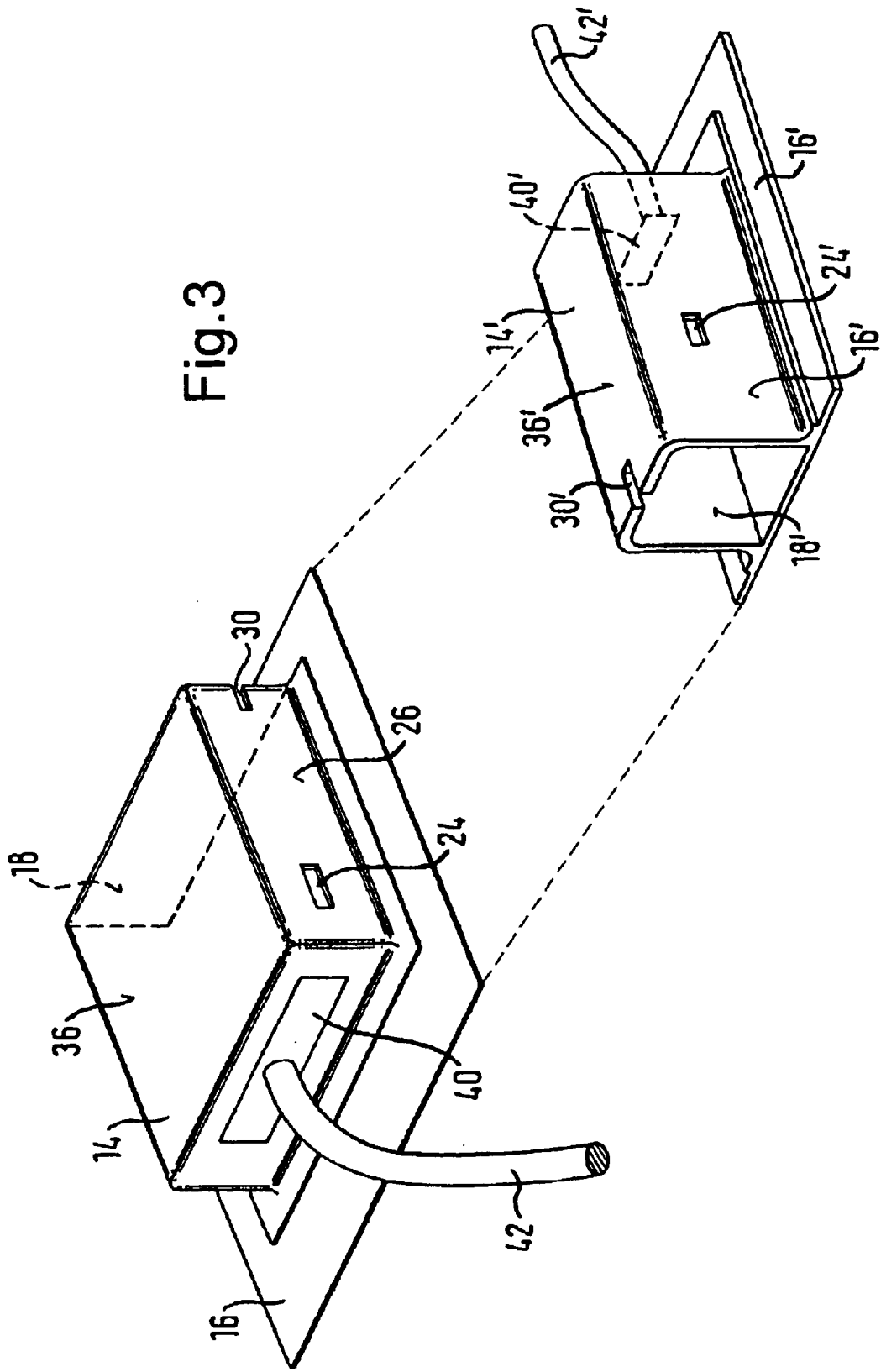

HOUSING FOR SAFETY-RELEVANT CONTROL DEVICES IN VEHICLES

The present invention relates to a housing system for safety-relevant control devices in vehicles, comprising a receptacle attached to the car body and a housing part that can be inserted into the receptacle.

BACKGROUND OF THE INVENTION

In order to ensure the safe and reliable function of occupant restraint systems such as seatbelt tensioners and airbags in a particular vehicle model, it is necessary that the control device intended for that particular vehicle model is, in fact, installed. Inadvertent exchange of the control device can have the consequence that, due to the different vehicle-specific data and/or due to a different directionality of the sensors, the occupant restraint system is deployed or locked too soon, too late or not at all. In order to prevent such confusion, until now, coding has been provided in the form of a vehicle-specific plug and a complementary socket and/or in the form of a vehicle-specific coding pin that is located on the baseplate of the control device. These solutions have in common that, due to their relatively complicated handling, they are quite time-consuming during the assembly.

SUMMARY OF THE INVENTION

The invention provides a housing system for safety-relevant control devices that simply and reliably ensures that only the assembly of a control device intended for that particular vehicle model is possible. This is achieved with a housing system for safety-relevant control devices in vehicles by means of a receptacle attached to the car body and a housing part that can be inserted into the receptacle in that the receptacle and the housing part have complementary form-fitting elements that represent a coding and that engage each other when the housing part is mounted in the receptacle. The assembly is permitted to be completed only when the form-fitting elements of the receptacle and the housing part have fulfilled a predefined complementarity condition. Via the coding of the receptacles and the housing parts, a reliable as well as a simple and thus quickly implemented solution is provided which prevents a control device intended for another vehicle model from being installed.

Quick assembly is achieved with a preferred embodiment in that the housing part can be slid into the receptacle. Here, it is especially advantageous if the housing part can be latched into place in the receptacle so that the housing part can be attached in the receptacle in a simple manner.

According to another advantageous embodiment, it is provided that the housing part is made of plastics and the receptacle is made of metal. This provides a housing system whose metal component ensures a reliable protection for the control against damage of any kind and whose plastic housing component entails production-related advantages as well as cost advantages.

Another advantageous embodiment provides that the housing part and the receptacle have complementary plug connector elements. Here, it is especially advantageous if the plug connector elements are uniformly provided with contact assignments independent of the coding. With this embodiment, the electrical connection is made when the housing part is inserted into the receptacle. Since the coding function is fulfilled by the housing part and the receptacle, the contact assignment can be uniform and thus independent of the vehicle model.

According to another preferred embodiment, at least one secondary receptacle attached to the car body and one secondary housing part that can be inserted into the secondary receptacle are provided, a direction-dependent sensor being arranged in the secondary housing part. The secondary receptacle and the secondary housing part have complementary form-fitting elements that represent a coding and that engage each other during the assembly of the secondary housing part in the secondary receptacle. Here, too, assembly is permitted to be completed only when the form-fitting elements of the receptacle and the housing part have fulfilled a predefined complementarity condition. The assembly also determines the relative position of the housing part and thus of the direction-dependent sensor, to the housing part. Thus, for example, in the case of airbag systems with several airbags, it is ensured that the direction-dependent sensors are installed in the right place and with the right orientation in the vehicle. Consequently, different housing concepts for different direction-dependent sensors, which was necessary with the prior art airbag systems, have become superfluous.

BRIEF DESCRIPTION OF THE DRAWINGS

Additional advantages and features of the invention ensue from the following description and from the drawings to which reference is made. The drawings show the following:

FIG. 3—a perspective view of a housing system according to the invention.

DESCRIPTION OF THE PREFERRED EMBODIMENTS

Figure 1:
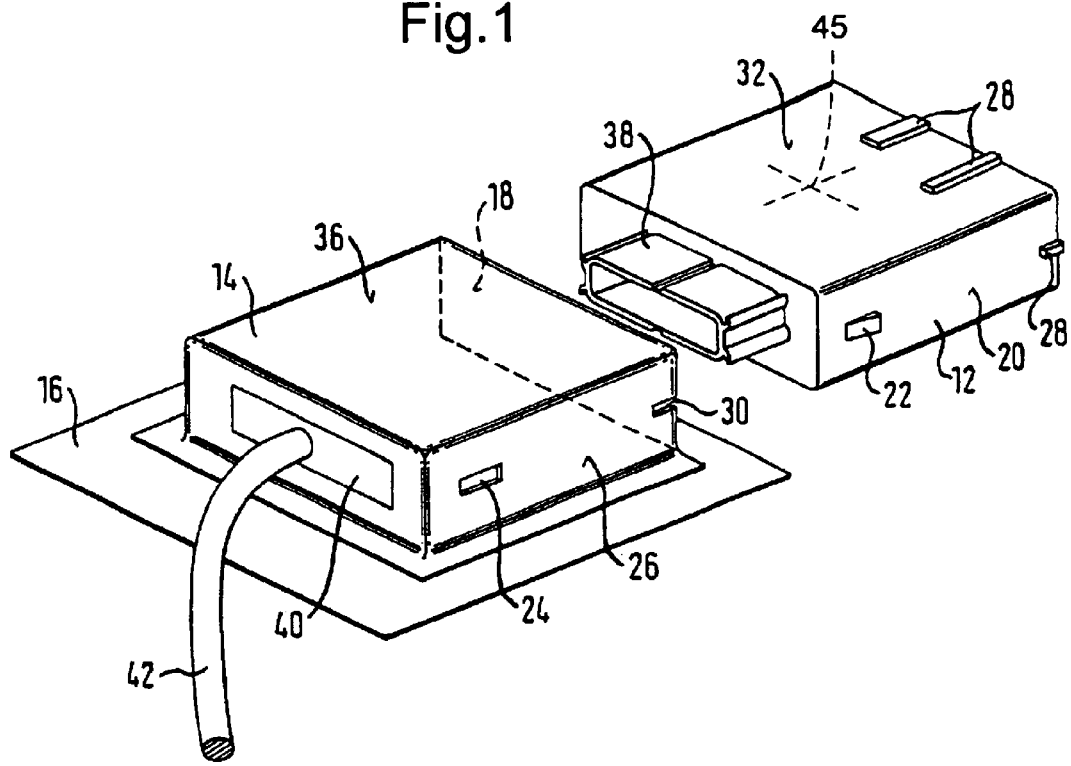
FIG. 1—a perspective view of a receptacle and of a housing part of a housing system according to the invention.
Figure 2:
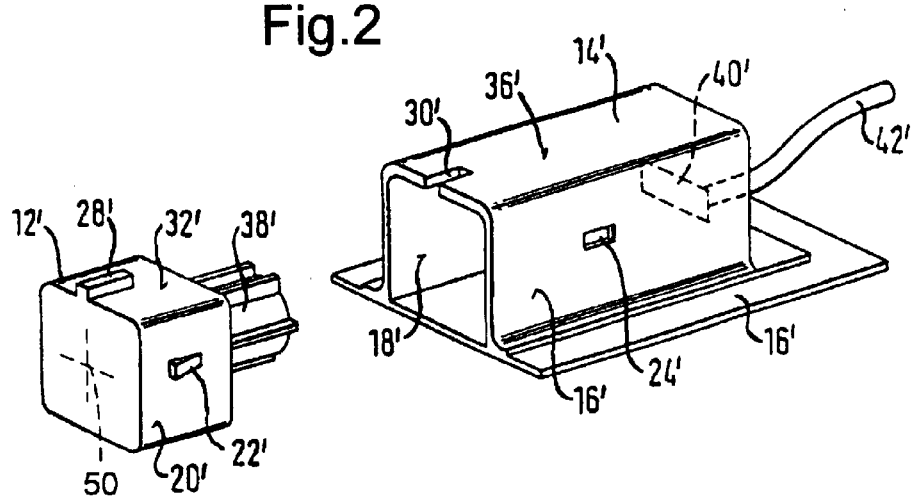
FIG. 2—a perspective view of a secondary receptacle and of a secondary housing part of the housing system according to the invention as shown in FIG. 1.

Since many of the characteristic features of the embodiment of the housing art and receptacles of FIGS. 1–3 are the same, the description below will make reference to all figures at the same time:

The housing system of FIGS. 1–3 has housing parts 12, 12' made of plastic and receptacles 14, 14' made of metal, which are attached via several points by means of a welding process to a piece of metal 16, 16' of the car body. The housing parts 12, 12' and the receptacles 14, 14' are essentially cuboidal in shape, one end face 18, 18' of the receptacles being designed so as to be open. On the housing parts 12, 12', both side surfaces 20, 20' having latching elements 22, 22' which serve to attach the housing parts 12, 12' via complementary latching elements 24, 24', which are located on the side surface 26, 26' on the receptacles 14, 14'. Form-fitting elements 28, 28' on the side surfaces 20 and the upper surface 32, 32'—relative to FIGS. 1–3—of the housing parts 12, 12' and of the form-fitting elements 30, 30' on the side surfaces 26 and the upper surfaces 36, 36'—relative to FIGS. 1–3—of the receptacles 14, 14' are configured as projections and recesses respectively. They interact in such a way that a complete insertion of the housing parts 12, 12' into the receptacles 14, 14' is only possible when the positions of the projections on the housings parts 12, 12' match the positions of the recesses in the receptacles 14, 14' in the inserted state. The housing parts 12, 12' each have a plug connector collar 38, 38' that is designed so as to be complementary to a connector socket 40, 40' in the receptacles 14, 14'. The connector sockets 40, 40' are each connected to a cable harness 42, 42' which projects out of each end face of the receptacles 14, 14' located opposite from the open end face 18, 18'.

When it comes to airbag systems having several airbags equipped with acceleration sensors installed at several places in the vehical, housing parts and receptacles are needed for the various acceleration sensors and for the control device. The housing part shown in FIG. 1, for example, constitutes such a hoousing housing for the electronic control of several air bags and contains the safety-revelant control device 45, and the housing part shown in FIG. 2 is intended for an acceleration sensor 50 of such a system.

The assembly of the housing system is carried out in the same manner for the housing parts 12, 12' shown in FIG. 1 and FIG. 2 and will now be illustrated with reference to the housing part 12 of FIG. 1:

During the assembly, first of all, a receptacle 14 associated with the vehicle model is welded onto a piece of metal 16 of the car body. Then the complementary housing part 12 is slid into the receptacle 14. Via the projections on the housing part 12 and corresponding recesses in the receptacle 14, the housing part 12 latches into the receptacle 14. Since the connector socket 40 is already mounted on the receptacle 14, the electrical contact is made when the housing part 12 is slid into place and consequently, this does not take any additional time during the assembly. The coding is provided by the form-fitting elements 28, 30 on the housing part and the receptacle 12, 14, so that the plug connector elements 38, 40 no longer have to fulfill this function as was the case with the versions already known from the state of the art, and a uniform design of contact assignments of the connector collar 38 and of the connector socket 40 is possible, regardless of the vehicle model. This can save costs during the manufacture of the plug connector elements.

If an attempt is inadvertently made to slide a "non-fitting" housing part 12 all the way into the receptacle 14 during assembly, this will not be possible since the projections of the housing part 12 will not coincide with the recesses of the receptacle 14.

On the one hand, this has the advantage that the assembly of the housing part by means of the sliding and the automatic latching in the receptacle takes very little time. On the other hand, a simple and reliable solution is provided which prevents a control device intended for a different vehicle model from being installed, and prevents housings with direction-dependent sensors from being mounted at the wrong place in the vehicle.

As an alternative to the attachment of the housing part in the receptacle by means of latching elements, an attachment by means of a screwed connection point is provided.

Instead of a plastic housing, it is also possible to use an aluminum housing made by means of a die casting or extrusion molding method.

What is claimed is:

1. A housing system for a safety-relevant control device, the system comprising:

a receptacle directly welded to a car body, and a housing part for insertion into the receptacle, the housing part housing a safety relevant control device, the receptacle having an open end face and a plurality of walls including two side walls and an upper wall and the housing part having a plurality of side walls including two side walls, an upper wall and a back wall, at least one of said side walls and said upper walls of said housing part and said receptacle including complementary form-fitting elements that represent a coding that engage each other when the housing part is inserted completely in the receptacle so that said side walls and upper wall of the receptacle completely surrounds the side walls and upper wall of the housing part and only when the form-fitting elements of the receptacle and the housing part satisfy a predefined complementary condition, the receptacle having a first plug connector element mounted thereon, the housing part having a second plug connector element mounted thereon which is complementary to the first plug connector element, the plug connector elements are adapted to be connected with each other when the housing part is inserted into the receptacle.

2. The housing system according to claim 1 wherein the safety relevant control device is a device for controlling activation of one of an air bag and a seat belt tensioner.

3. The housing system according to claim 1 wherein the safety relevant control device is a direction dependent acceleration sensor for sensing the direction and deceleration parameters indicating a vehicle crash.

4. The housing system according to claim 1 wherein the housing part is slidable into the receptacle, said form fitting elements including complementary recesses and projections that are slidable into each other.

5. The housing system according to claim 4 wherein said form fitting elements include latching elements for latching the housing part into place in the receptacle.

6. The housing system according to claim 4 wherein the housing part is made of plastics and the receptacle is made of metal.

7. The housing system according to claim 4 wherein the housing part is made of aluminum and the receptacle is made of metal, the housing part being made by means of one of a die casting method and an extrusion method.

8. The housing system according to claim 2 wherein the second plug connector element of the housing part has a molded-on connector collar and the first plug connector of the receptacle has a complementary connector socket.

9. A connector system comprising:

a first housing system for a safety-relevant control device and a second housing system for a direction-dependent sensor;

the first housing system comprising a receptacle directly welded to a car body, and a housing part for insertion into the receptacle, the housing part housing a safety relevant control device, the receptacle having an open end face and a plurality of walls including two side walls and an upper wall and the housing part having a plurality of side walls including two side walls, an upper wall and a back wall, at least one of said side walls and said upper walls of said housing part and said receptacle including complementary form-fitting elements that represent a coding that engage each other when the housing part is inserted completely in the receptacle so that said side walls and upper wall of the receptacle completely surrounds the side walls and upper wall of the housing part and only when the form-fitting elements of the receptacle and the housing part satisfy a predefined complementary condition, the receptacle having a first plug connector element mounted thereon, the housing part having a second plug connector element mounted thereon which is complementary to the first plug connector element, the plug connector elements are adapted to be connected with each other when the housing part is inserted into the receptacle; and the second housing system including a second receptacle directly welded to the car body and a second housing part for insertion into the second receptacle, the direction-dependent sensor being arranged within the second housing part, the second receptacle having an open end face and a plurality of walls including two side walls and an upper wall and the second housing part having a plurality of side walls including two side walls, an upper wall and a back wall, at least one of said side walls and said upper walls of said second housing part and said second receptacle including complementary form-fitting elements that represent a coding and that engage each other during assembly of the second housing part in the second receptacle and engage each other only when the form-fitting elements of the second receptacle and the second housing part satisfy a predefined complementary condition, the second receptacle having a first plug connector element mounted thereon, the second housing part having a second plug connector element mounted thereon which is complementary to the first plug connector element, the plug connector elements are adapted to be connected with each other when the second housing part is inserted into the second receptacle.

10. The housing system according to claim 9 wherein the direction dependent sensor is an acceleration sensor.

* * * * *

UNITED STATES PATENT AND TRADEMARK OFFICE
CERTIFICATE OF CORRECTION

PATENT NO. : 6,722,925 B2
APPLICATION NO. : 09/998981
DATED : April 20, 2004
INVENTOR(S) : Robert Skofljanec It is certified that error appears in the above-identified patent and that said Letters Patent is hereby corrected as shown below:

Column 4, line 37 after "claim" change "2" to --4--.

Signed and Sealed this

Third Day of October, 2006

JON W. DUDAS
*Director of the United States Patent and Trademark Office*